(12) United States Patent
Weidner

(10) Patent No.: US 8,087,685 B2
(45) Date of Patent: Jan. 3, 2012

(54) SECURING DEVICE FOR HEAD TUBE BEARINGS, AND METHOD FOR SECURING HEAD TUBE BEARINGS

(76) Inventor: Frank Weidner, Stuttgart (DE)

( * ) Notice: Subject to any disclaimer, the term of this patent is extended or adjusted under 35 U.S.C. 154(b) by 1031 days.

(21) Appl. No.: 11/919,599

(22) PCT Filed: May 12, 2006

(86) PCT No.: PCT/DE2006/000826
§ 371 (c)(1),
(2), (4) Date: Jan. 2, 2008

(87) PCT Pub. No.: WO2006/119757
PCT Pub. Date: Nov. 16, 2006

(65) Prior Publication Data
US 2008/0205981 A1  Aug. 28, 2008

(30) Foreign Application Priority Data
May 12, 2005 (DE) .......................... 10 2005 022 808

(51) Int. Cl.
*B62K 1/00* (2006.01)
*B62K 21/12* (2006.01)
(52) U.S. Cl. ...................................... 280/279; 74/551.1
(58) Field of Classification Search ................... 280/279; 74/551.1
See application file for complete search history.

(56) References Cited

U.S. PATENT DOCUMENTS

| | | |
|---|---|---|
| 627,187 A | 6/1899 | Hall |
| 5,095,770 A | 3/1992 | Rader, III |
| 5,332,245 A | 7/1994 | King |
| 5,385,360 A * | 1/1995 | Shook ........................... 280/279 |
| 5,540,457 A | 7/1996 | Johnson |
| 5,544,905 A | 8/1996 | Chen |
| 5,615,585 A * | 4/1997 | Chi ............................... 74/551.1 |
| 5,893,574 A | 4/1999 | Campagnolo |
| 6,019,017 A | 2/2000 | Lin |
| 6,126,323 A | 10/2000 | Tange |
| 6,167,780 B1 | 1/2001 | Chen |
| 6,254,115 B1 * | 7/2001 | Lin ............................... 280/279 |

(Continued)

FOREIGN PATENT DOCUMENTS
DE  76 11 747  12/1976
(Continued)

*Primary Examiner* — Victor MacArthur
(74) *Attorney, Agent, or Firm* — Jordan and Hamburg LLP

(57) ABSTRACT

The invention relates to a securing device for head tube bearings of two-wheel vehicles, e.g. bicycles. The head tube bearing comprises a top and a bottom bearing unit, with the aid of which a tubular shaft of the fork of the two-wheel vehicle can be rotatably connected to a head tube of the frame of the two-wheel vehicle. The inventive securing device is composed of a thrust bearing which can be locked onto the tubular shaft above the top bearing unit and is effectively connected to a mechanism applying an axial pressure to the top bearing unit, henceforth referred to as an axial pressure mechanism. This has the advantage that securing the clearance of the head tube bearing is entirely independent of the handlebar fixture. The thrust bearing is locked in relation to the tubular shaft once the disclosed thrust bearing comprising the axial pressure mechanism has been placed on the tubular shaft and has been slid onto the top bearing unit until reaching the stop. The axial pressure is then applied to the top bearing unit by means of said mechanism.

2 Claims, 3 Drawing Sheets

U.S. PATENT DOCUMENTS

| | | | |
|---|---|---|---|
| 6,892,604 B2 * | 5/2005 | Tison et al. | 74/551.1 |
| 7,069,812 B1 * | 7/2006 | Rettig | 74/551.1 |
| 2003/0172768 A1 | 9/2003 | Li | |
| 2005/0093269 A1 | 5/2005 | Horiuchi | |

FOREIGN PATENT DOCUMENTS

| | | |
|---|---|---|
| DE | 94 20 884.0 | 2/1995 |
| DE | 295 20 093 | 2/1996 |
| DE | 195 31 700 | 3/1997 |
| DE | 196 44 968 | 5/1997 |
| DE | 299 05 860 | 6/1999 |
| DE | 200 03 817 | 4/2000 |
| DE | 199 40 969 | 11/2000 |
| DE | 103 30 419 | 2/2005 |
| EP | 1 529 725 | 5/2005 |
| FR | 2 815 928 | 5/2002 |
| WO | WO-2004/031027 | 4/2004 |

* cited by examiner

SECURING DEVICE FOR HEAD TUBE BEARINGS, AND METHOD FOR SECURING HEAD TUBE BEARINGS

BACKGROUND OF THE INVENTION

The invention starts out from a locking device for steering head mountings of two-wheel vehicles, such as bicycles, having an upper bearing unit and a lower bearing unit which rotationally connect a shaft tube of the fork of the two-wheel vehicle immovably with a steering head tube of the frame of the two-wheel vehicle.

In order to ensure a clearance-free mounting between the steering head tube, belonging to the frame of the two-wheel vehicle, and the shaft tube of the fork, an axial force must be applied permanently on the mountings of the latter. Because of the thread, which weakens the cross section of the shaft tube as well as because of damage to the shaft tube, the threaded connections, which are known for this purpose and for which the handle stem is pressed by means of a set screw, screwed into the shaft tube of the fork, against a divided compression ring of the upper bearing unit (U.S. Pat. No. 5,095,770) or for which a fastening nut, screwed onto the shaft tube, presses a clamping ring against a conical centering ring (U.S. Pat. No. 5,544,905), have a greater susceptibility for breaking prematurely in situations of extreme stress.

An independent locking of the steering head mounting, for which the handlebars can be dismantled without affecting the bearing clearance set, comprises a compression ring, the inner surface of which is provided with sharp, tooth-like grooves, by means of which it is pressed by means of compression elements against the outer casing of the shaft tube. These compression elements embrace the compression ring radially and may consist of a conical threaded connection or of a cylindrical clamping ring (U.S. Pat. No. 5,332,245). For this solution also, the shaft tube is affected by the application of radial clamping forces, since the sharp edges of the compression ring work their way into the surface of the shaft tube and these grooves can be the cause of premature breakage in the case of extreme stresses.

In a case of a similar solution, which evidently makes do without the mechanical impairment of the shaft tube, the compression ring is pressed by means of a threaded connection, consisting of a half bearing for the upper bearing unit and the lock nut, against the shaft tube. For this purpose, the compression ring has an upper short conical surface and a lower long conical surface, as well as several axial slots, which are open at the top. By screwing the half bearing and the lock nut together, the elastic regions of the compression ring, remaining between the slots, are pressed against the shaft tube (DE G 94 20 884.0). The disadvantage of this solution as well as of the aforementioned locking of the steering head mounting of U.S. Pat. No. 5,332,245 consists therein that the axial pressure for ensuring the absence of clearance in the bearing initially must be applied on the compression ring by hand, for example, by depressing the handle stem and, moreover, until the threaded connections or the clamping connections take effect. Such a manual application of pressure is physically strenuous and, moreover, not reproducible.

Finally, a steering head mounting for two-wheel vehicles is known, for which the compression ring is part of the inner ring of the upper bearing unit. The clamping ring can be placed on the conical outer surface of the compression ring. The conical outer surface of the compression ring, as well as the complementary inner surface of the clamping ring are configured so that the connection is self retaining after a single application of pressure on the clamping ring, so that spring-back of the elastic part of the inner ring is prevented permanently (DE 103 30 419 A1). If tapered roller bearings, which also absorb axial forces, are used in the steering head mounting, the self retention between the inner ring and the compression ring admittedly prevent a spring-back of the elastic parts of the inner ring during or after the installation. However, an additional locking device is required in order to absorb the axial components of the forces of the tapered roller bearing. It is also a disadvantageous that the tapered seat connection cannot be loosened readily.

SUMMARY OF THE INVENTION

As against the above approaches, the locking device according to the invention, as well as the method for locking steering head bearings also in accordance therewith, have the advantage that the securing of the clearance of the steering head mounting is completely independent of the fastening of the handlebars. After the inventive abutment with its device for applying an axial pressure, which is referred to in the following as the axial pressure device, is placed on the shaft tube and pushed onto the upper bearing unit up to the stop, the abutment is locked in position with respect to the shaft tube. Subsequently, the axial pressure is exerted on to the upper bearing unit by means of said device. This can be accomplished in different ways, for example, by screwing out bolts or eccentrics. Should the clearance increase in the course of using the two-wheel vehicle, it can be reduced again by adjusting the axial pressure device. The locking device can be operated without exerting much force, that is, it is no longer necessary to apply axial pressure directly and manually on the upper bearing unit. The adjusting device operates as a transmission of a manual adjusting movement.

Of course, the locking device can also be used for additionally locking a self-holding steering head mounting, for which the axial pressure is generated already by mounting a clamping ring, as described, for example, in the DE 103 30 419 A1. This is advantageous especially when tapered roller bearings are used.

For a particularly advantageous embodiment of the invention, the abutment consists of a clamping ring, which can be locked in position on the shaft tube, and the axial pressure device consists of a compression ring, which can be rotated and is disposed rotatably movably below the clamping ring. The compression ring acts with its lower end surface directly or indirectly on the upper bearing unit. The mutually facing end surfaces of clamping ring and compression ring each have at least one contour, which protrudes out of the plane of the end surface. At least one of the contours emerges continuously from the end surface and thus forms a rising slope. This contour or these contours form flat wedges on the respective end surfaces. Advisably, the contours are always disposed in pairs opposite to one another. The compression ring and the compression ring are provided with a tangentially acting control device, which twist the compression ring with respect to the locking clamping ring. The clamping ring is moved about its axis by actuating the control equipment. As a result, the two contours, projecting out of the end surfaces of the holding and compressing ring, mutually interact with one another and the distance between the two rings is increased thereby. Since the clamping ring is seated firmly on the shaft tube, the compression ring moves axially downward onto the upper bearing unit and, in so doing, presses onto the part of the steering head mounting, which produces the axial and/or radial clamping pressure. Because of the kinematic ratio while producing the axial movement from a rotational movement of the compression ring, a reversal of the movement, that is, an easing off of axial pressure because of the counteracting axial components of the clamping pressure on the shaft tube, is not likely, so that this locking of the steering head mounting is reliable permanently.

According to an advantageous embodiment of the invention, a clamping ring consists of an open ring, which can be locked in position on the shaft tube by a clamping screw at its opening.

According to a different, advantageous embodiment of the invention, the at least one contour, which emerges from the end surface and does not slope, is constructed bead-like, so that it acts as a cam, as it slides along the opposite, wedge-shaped contour.

According to a different, advantageous embodiment of the invention, at least two contours, emerging from the plane of the end surfaces, are provided in each case. If there are several contours, which bring about the axial movement, the surface pressure per contour is reduced, as is the stress on the material. Moreover, the tendency of the compression ring to tilt with respect to the shaft tube is reduced, as a result of which binding of the locking device is prevented. If only two contours are provided to bring about the axial movement, they should basically be disposed diametrically opposite to one another. Tilting can then be excluded completely if three acting contours are provided.

According to an additional, advantageous embodiment of the invention, the contours have a rising slope at both mutually facing end surfaces of the clamping ring and the compression ring. This has the advantage that the surface pressure of the contours, sliding on one another as the compression ring is twisted, is reduced and, as a result, it becomes easier to adjust the clearance of the steering head mounting.

According to a further embodiment of the invention, the surface of the contour, emerging from the end surface or surfaces, has a saw tooth-like profile. By these means, a locking adjustment of the clearance of the steering head mounting is possible and any automatic turning back of the compression ring, because of the counter-acting axial component of the clamping pressure on the shaft tube, is prevented.

According to a different, advantageous embodiment of the invention, a compression element, at which a control element of a control device, disposed at the clamping ring, engages tangentially, is provided as a means for twisting the compression ring with respect to the clamping ring in the edge region of the compression ring.

According to an embodiment of the invention, advantageous in this respect, the compression element consists of a pin. The control device of the clamping ring is accommodated in a reinforcement of the casing of the clamping ring, protruding to the outside. It is provided with a recess, which is open from below and extends along the casing of the clamping ring and into which the pin protrudes. Furthermore, a threaded borehole, which ends in the longitudinal recess, is provided in the reinforcement of the casing and extends tangentially to the casing of the clamping ring. As control element, a locking screw can be screwed into the threaded borehole and, with its screwed-in end, comes up against the pin and, as it is screwed in further, shifts the pin within the recess.

As already described above, the steering head mounting is locked by an axial pressure, which acts upon the upper bearing unit and which emanates from an abutment, previously connected firmly with the shaft tube, and applied by means of an axial pressure device, which carries out an axial movement with respect to the abutment.

In accordance with an embodiment of the invention, which is advantageous in this respect, the axial movement is produced by a radial twisting of this axial pressure device with respect to the abutment, the abutment and the axial pressure device being constructed with various approaches in accordance with aspects of the invention.

Further advantages and advantageous developments of the invention may be inferred from the following description of an example, the drawing and the claims.

An example of the invention is described in greater detail in the following and shown in the drawing.

DETAILED DESCRIPTION OF THE INVENTION

Figure 1:
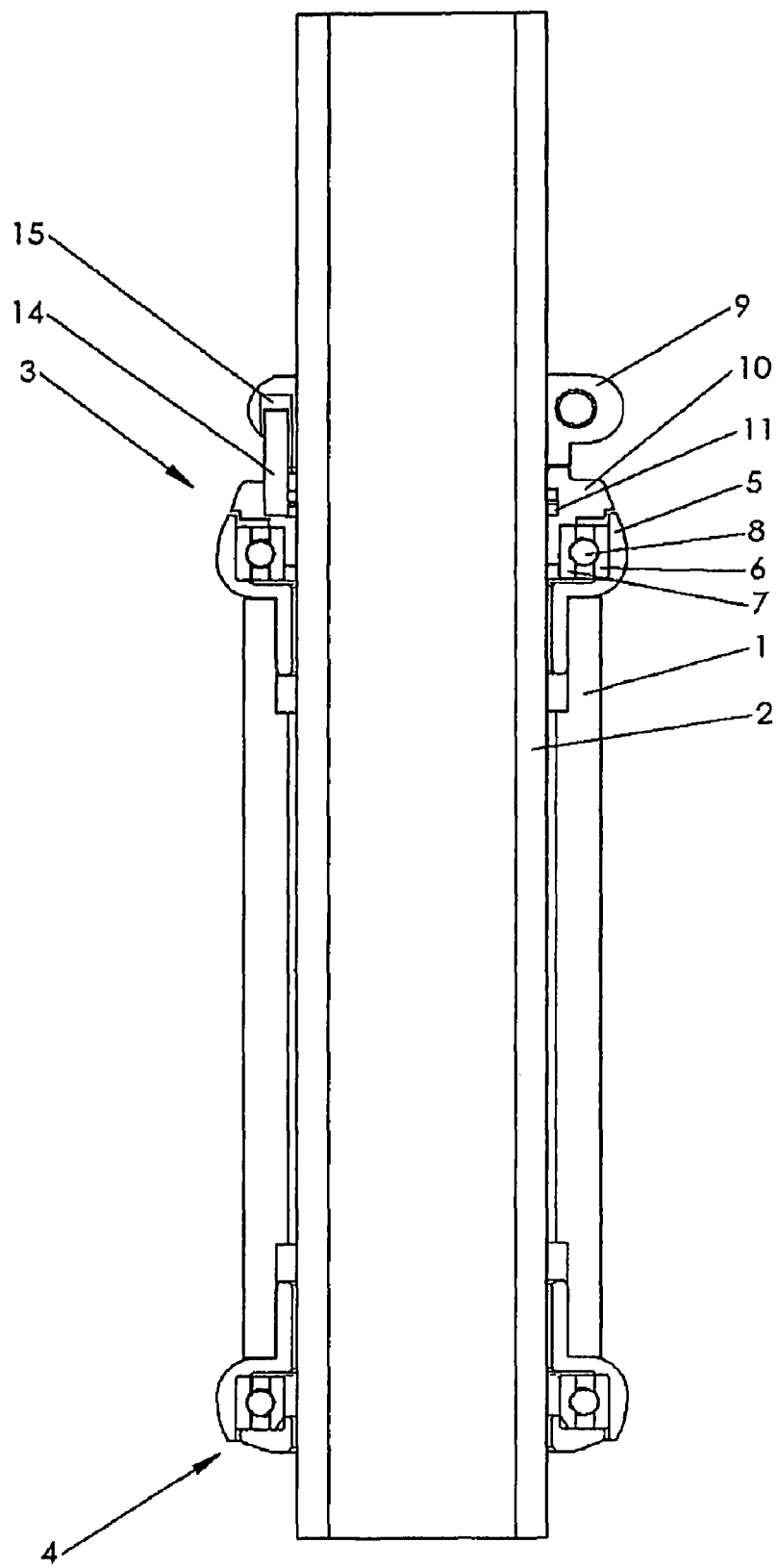
FIG. 1 shows a sectional representation through a steering head mounting.
Figure 2:
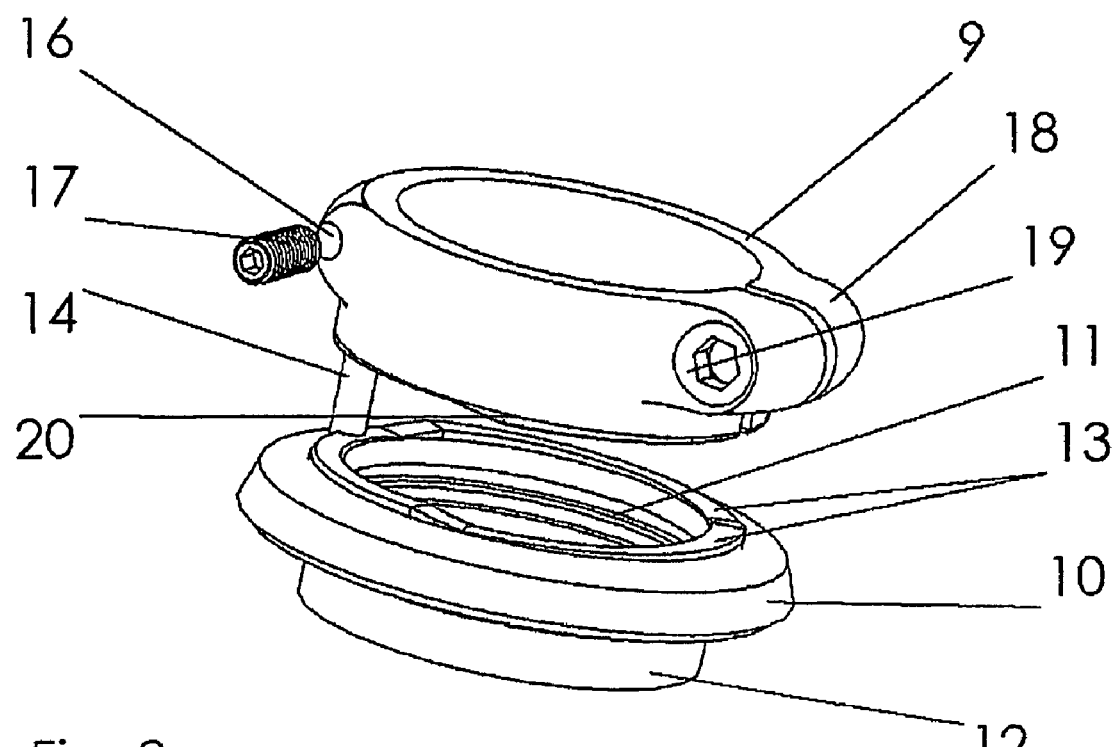
FIG. 2 shows a spatial representation of the locking device.
Figure 3:
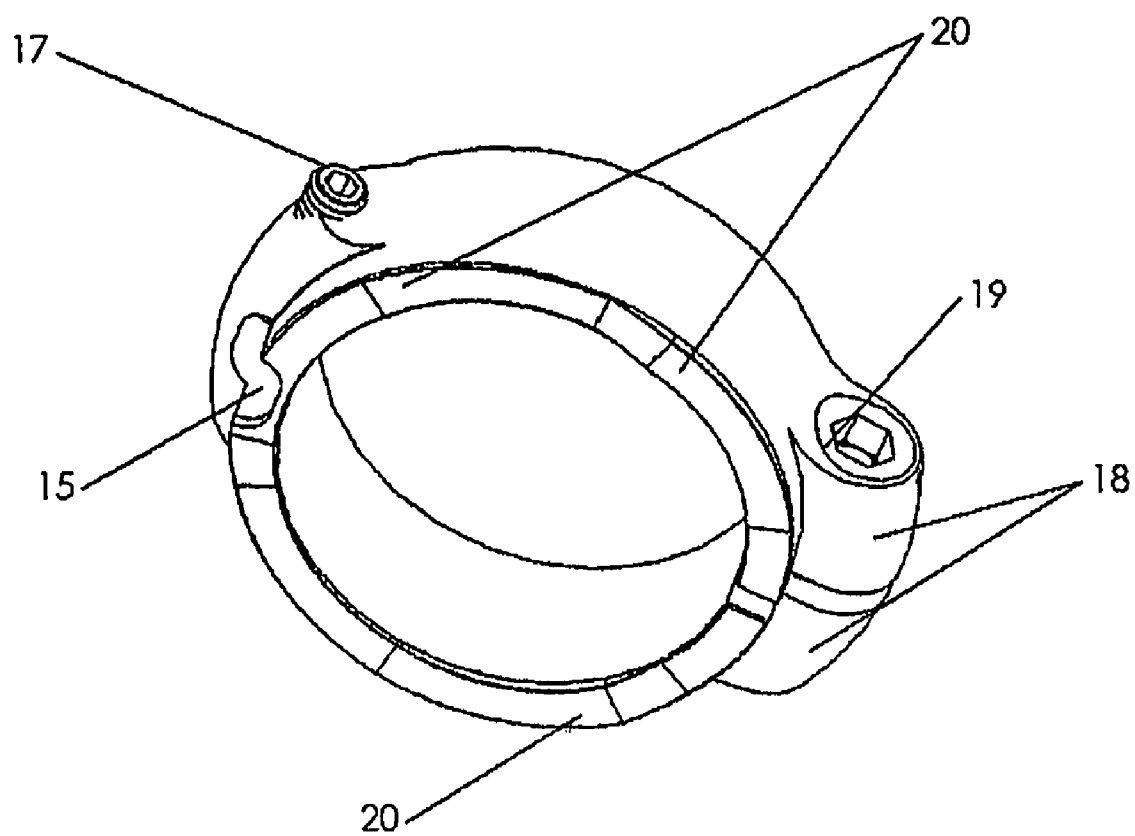
FIG. 3 shows a spatial view of the clamping ring of the locking device from below.

As can be seen from FIG. 1, the steering head mounting consists of a steering head tube 1, in which a shaft tube 2 of a fork of a two-wheel vehicle, the details of which are not shown here, is mounted rotatably by means of an upper bearing unit 3 and a lower bearing unit 4. Angular ball bearings, for example, may be used as bearings. The steering head tube 1 is a component of the frame of the two-wheel vehicle, which is also not shown here. For accommodating the upper bearing unit 3, the steering head tube 1 has at its upper end a half bearing 5, into which a ball bearing, comprising an outer ring 6, an inner ring 7 as well as balls 8, is pressed. The upper bearing unit 3 is covered by the inventive locking device, which is shown in FIG. 2. It consists of a clamping ring 9 and a compression ring 10, which, in the present example, is constructed as a lid, which closes off the whole of the upper bearing unit 3 in the upward direction. For equalizing the radial clearance between the compression ring 10 and a shaft tube 2, as well as for sealing the upper bearing unit 3, the compression ring 10 has at its cylindrical inner surface to grooves 11 for accommodating seals, such as O ring seals. Furthermore, the compression ring 10 has a cylindrical guiding part 12, against the outer surface of which the inner ring 7 lies with the least possible clearance. The upper end surface of the compression ring 10 is provided with three wedge-shaped elevations 13 arising out of the end surface, the upward slope of the elevations extending in the same direction, which happens to be the counterclockwise direction in the present example. Moreover, a pin 14 protrudes out of the upper end surface of the compression ring 10. As can be seen from FIG. 3, the pin 14 is taken up by a longitudinal recess 15, which is recessed into the wall of the clamping ring 9. The recess 15 has the same curvature as the casing of the clamping ring 9, so that the pin 14 can slide into the latter. Furthermore, a threaded borehole 16, into which a locking screw 17 can be screwed, terminates tangentially to the clamping ring 9 in the recess 15. The clamping ring 9 is divided and provided at its division with means for clamping it to the shaft tube 2. In the present case, the two ends of the clamping ring 9, formed by the division, are constructed at this place as eyebolts 18, into which a clamping screw 19 can be screwed. As is furthermore evident from FIG. 3, the clamping ring 9 also has at its lower end surface three wedge-shaped elevations 20 arising of the end surface. However, the upward slope is in the opposite direction to that of the elevations 13 of the compression ring 10. The position of the pin 14, as well as the division and upward slope of the elevations 13 and 20 are matched to one another so that, when the wedge-shaped elevations 20 of the clamping ring 9 contact and cover equally the complementary wedge-shaped elevations 13 of the compression ring 10, the pin 14 lies within the recess 15 against the wall, at which the threaded borehole 16 for the locking screw 17 enters the recess.

In the following, the mode of action of the invention is to be explained in greater detail. For locking the upper bearing unit 3, the compression ring 10 and the clamping ring 9 are pushed onto the shaft tube 2 until they come up against the stop of the inner ring 7. The pin 14 at the same time protrudes into the recess 15 of the clamping ring 9. In this position, the locking screw 17 is screwed into the clamping ring 9 only so far, that it does not yet protrudes into the recess 15. Subsequently, the clamping ring 9 is positioned so that there is the least possible distance between the clamping ring 9 and the compression ring 10, that is, so that the wedge-shaped elevations 13 and 20 are complementarily opposite to one another. In this position, the clamping ring 9 is clamped to the shaft tube 2 by tightening the clamping screw 19. Subsequently, the locking screw 17 is turned further into the recess 15 until it presses against the pin 14 and beyond this, until there is a sufficiently large counteracting resistance, without bending the pin 14 or shearing it off and without stripping the thread. As a result, the pin 14 moves on an arc within the recess 15. The compression ring 10, which is firmly connected with the pin 14, participates in the short rotational movement. At the same time, because of the sliding of the wedge-shaped elevations 13 and 20 on top of one another, the compression ring 10 also moves a small distance in the axial direction and consequently moves on the inner ring 7 towards the upper bearing unit 3. The pin 14 evades the pressure of the locking screw 17, until the compression ring 10 lies firmly against the inner ring 7, locking the latter. The axial movement of the compression ring 10 amounts to several 10th of a millimeter up to approximately 1 mm. Penetration of moisture and dirt into the upper bearing unit 3 is prevented by inserting sealing rings, such as O rings, into the grooves 11 of the compression ring 10. In addition, it is still possible to protect the resulting small gap by a seal contacting the external casing of the clamping ring 9 and the compression ring 10. The locking screw 17 may be secured additionally to prevent any sliding back of the compression ring 10 and the therewith associated loosening of the upper bearing unit 3.

All the distinguishing features, presented in the specification and the claims that follow and shown in the drawing may be essential to the invention individually as well as in any combination with one another.

LIST OF REFERENCE SYMBOLS 1. steering head tube
2. shaft tube
3. upper bearing unit
4. lower bearing unit
5. half bearing
6. outer ring
7. inner ring
8. balls
9. clamping ring
10. compression ring
11. groove
12. cylindrical parts
13. wedge-shaped elevations
14. pin
15. elongated recess
16. threaded borehole
17. locking screw
18. eyebolt
19. clamping screw
20. wedge-shaped elevation

The invention claimed is:

1. A locking device mounting a shaft tube of a fork of a two wheeled vehicle within an upper bearing unit, lower bearing unit and a steering head tube of a frame of the vehicle, the shaft tube and steering head tube defining an axial direction, the locking device comprising:
    a clamping ring having a split bifurcating a first end of the clamping ring, a clamping screw traversing the split perpendicularly to lockingly compress the ring to the shaft tube, a looking screw received in a threaded borehole perpendicular to the axial direction and located on a second side of the clamping ring opposite the split, a bottom surface having a plurality of identical wedge-shaped elevations tapering in a circumferential direction of the clamping ring, the bottom surface having an elongated recess therein extending in the axial direction;
    a compression ring having a top surface with a plurality of identical wedge-shaped elevations tapering in a circumferential direction of the compression ring and a pin extending from the compression ring to be received within the elongated recess, wherein
    threading of said locking screw into the threaded borehole to abut the pin shifts the pin on an arc in the recess to cause the compression ring to rotate relative to the clamping ring: such that the wedge-shaped elevations of the compression ring slidingly engage with the wedge-shaped elevations of the clamping ring to force the compression ring to apply an axial pressure on the upper bearing unit.

2. A locking device mounting a shaft tube of a fork of a two wheeled vehicle within an upper bearing unit, a lower bearing unit and a steering head tube of a frame of the vehicle, the shaft tube and steering head tube longitudinally extending in an axial direction, the locking device comprising:
    a clamping ring having a split bifurcating a first end of the clamping ring, a clamping screw traversing the split crosswise to lockingly compress the ring to the shaft tube, a bottom surface including a first set of generally wedge-shaped elevations axially tapering in a circumferential direction of the clamping ring, the bottom surface further including an elongated recess therein extending in the axial direction;
    a compression ring having a top surface including a second set of generally wedge-shaped elevations axially tapering in a circumferential direction of the compression ring and a pin extending from the compression ring to be received within the elongated recess; and
    a locking screw received in a threaded borehole crosswise to the axial direction and located on a second side of the clamping ring opposite the split, threading of said locking screw into the threaded borehole to abut the engagement member shifting the engagement member along an arc in the recess to cause the compression ring to rotate relative to the clamping ring such that the second set of generally wedge-shaped elevations of the compression ring slidingly engage the first set of generally wedge-shaped elevations of the clamping ring, forcing the compression ring to apply an axial pressure on the upper bearing unit.

* * * * *